US012703340B2

(12) United States Patent
Schacherl et al.

(10) Patent No.: US 12,703,340 B2
(45) Date of Patent: Aug. 11, 2026

(54) ELECTROHYDRAULIC ACTUATOR FOR A BRAKE SYSTEM

(71) Applicant: Robert Bosch GmbH, Stuttgart (DE)

(72) Inventors: Alice Schacherl, Burgberg (DE); Ben Ferguson, Rettenberg (DE); Bernd Lutz, Kempten (DE); Christoph Voelkel, Waltenhofen (DE); Guenter Escher, Oberstdorf (DE); Ignaz Hatt, Buchenberg (DE); Martin Winkler, Sonthofen (DE); Sven Langhorst, Kempten (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/864,734

(22) PCT Filed: May 26, 2023

(86) PCT No.: PCT/EP2023/064190
§ 371 (c)(1),
(2) Date: Nov. 11, 2024

(87) PCT Pub. No.: WO2023/232681
PCT Pub. Date: Dec. 7, 2023

(65) Prior Publication Data

US 2025/0340193 A1 Nov. 6, 2025

(30) Foreign Application Priority Data

May 30, 2022 (DE) ..................... 10 2022 205 441.5

(51) Int. Cl.
*B60T 13/74* (2006.01)

(52) U.S. Cl.
CPC ......... *B60T 13/745* (2013.01); *B60T 2270/82* (2013.01)

(58) Field of Classification Search
CPC ..................................................... B60T 13/745
See application file for complete search history.

(56) References Cited

U.S. PATENT DOCUMENTS 4,812,723 A * 3/1989 Shimizu ................ B60T 13/745 303/114.1
9,440,629 B2 * 9/2016 Ohnishi ................ B60T 17/088
(Continued)

FOREIGN PATENT DOCUMENTS

DE 102013213888 B3 11/2014
JP S6275261 U * 5/1987
(Continued)

OTHER PUBLICATIONS

JP S6275261 U with English translation. (Year: 2025).*
1 International Search Report for PCT/EP2023/064190, Issued Sep. 8, 2023.

*Primary Examiner* — Thomas E Lazo
(74) *Attorney, Agent, or Firm* — NORTON ROSE FULBRIGHT US LLP

(57) ABSTRACT

An electrohydraulic actuator for a brake system. The actuator includes: a housing defining an interior space and having first and second openings; a master brake cylinder positioned in the first opening and attached to the housing so that the first opening is sealed in a fluid-tight manner; an electric motor arranged on the housing; and a transmission in the interior space and kinematically coupled to the master brake cylinder. The transmission includes a transmission intermediate part which is moveable along a longitudinal axis and subdivides the housing, into a first housing region in which the master brake cylinder is arranged, and a second housing region facing the second opening. The actuator includes a compensating membrane closing the second opening in a fluid-tight manner and elastically deformable to reduce a pressure difference between the first and second housing
(Continued)

region when an axial displacement of the transmission intermediate part occurs.

10 Claims, 3 Drawing Sheets

(56) References Cited

U.S. PATENT DOCUMENTS

| | | | | |
|---|---|---|---|---|
| 2014/0319903 | A1* | 10/2014 | Murayama | B60T 11/30<br>303/15 |
| 2017/0341632 | A1* | 11/2017 | Han | F16H 19/04 |
| 2020/0172071 | A1 | 6/2020 | Lee et al. | |

FOREIGN PATENT DOCUMENTS

| | | | |
|---|---|---|---|
| JP | H01189108 | A | 7/1989 |
| JP | 2017043280 | A | 3/2017 |
| JP | 2017114398 | A | 6/2017 |
| JP | 2022072051 | A | 5/2022 |

* cited by examiner

L1
100
2
20
21,21B
11
22
1
21,21A
10
13
35
31,31A
S
33
32
F
32B
34
51A
14
12
51
51B
53
30B
5
30,30A
52

ELECTROHYDRAULIC ACTUATOR FOR A BRAKE SYSTEM

FIELD

The present invention relates to an electrohydraulic actuator for a brake system, in particular of a vehicle.

BACKGROUND INFORMATION

Electrohydraulic brake boosters are typically used in order to amplify an actuating force generated manually on a brake pedal by actuating a master brake cylinder by means of an electric motor. Electrohydraulic brake boosters are also used as actuators in so-called "brake-by-wire" systems, with which a control signal is generated by actuating the brake pedal or by other means and an electrohydraulic actuator is actuated based on the control signal for generating brake pressure.

German Patent No. DE 10 2013 213 888 B3 describes a hydraulic actuator for a brake system with a master brake cylinder, an electric motor and a transmission which couples the electric motor to the master brake cylinder in order to convert a movement of the motor into an actuation of the master brake cylinder. The transmission is accommodated in a housing, wherein the master brake cylinder is positioned in an opening in the housing.

One particular advantage of such electrohydraulic actuators is that they are able to bring about highly dynamic pressure changes in the brake system by rapidly axially adjusting the master brake cylinder via the transmission. In the housing, which as a rule is sealed in a fluid-tight manner from the surrounding area, rapid movement of components within the housing can, however, occasionally lead to the generation of considerable pressure differences between different regions of the housing, since a pressure equalization within the housing is often inhibited by components of the transmission.

SUMMARY

The present invention provides an electrohydraulic actuator.

The electrohydraulic actuator for a brake system according to an example embodiment of the present invention comprises a housing which defines an interior space and has a first opening and a second opening, a master brake cylinder which is positioned in the first opening and is attached to the housing in such a way that the first opening is sealed in a fluid-tight manner, an electric motor arranged on the housing, and a transmission which is accommodated in the interior space of the housing and is kinematically coupled to the master brake cylinder, wherein the transmission comprises a transmission intermediate part which can be moved along a longitudinal axis and which subdivides the housing, in relation to the longitudinal axis, into a first housing region, in which the master brake cylinder is arranged, and a second housing region, which faces the second opening. The actuator further comprises a compensating membrane which closes the second opening in a fluid-tight, in particular liquid-tight and preferably also gas-tight manner and which is elastically deformable in order to reduce a pressure difference between the first and the second housing region in the event of an axial displacement of the transmission intermediate part.

One concept underlying the present invention is to reduce the pressure differences within the housing caused by rapid movement of at least part of the transmission within the housing by arranging an elastically deformable membrane in an opening of the housing. The membrane changes its deformation state as a result of a change in pressure within the housing and in this way increases or decreases the effective volume of the particular housing region.

The master brake cylinder can be actuated by the electric motor via the transmission. In particular, the transmission comprises a part which can be displaced along a longitudinal axis and thereby actuates the master brake cylinder, e.g. by axially displacing a piston of the master brake cylinder. The transmission generally comprises a transmission intermediate part which subdivides the housing, in relation to the longitudinal axis, into a first and a second region. The first and second regions are connected to one another in a fluid-conducting manner, e.g. through a gap between the housing and the transmission intermediate part. These passages defined between the transmission intermediate part and the housing between the first and second housing regions form a considerable flow resistance during a rapid movement of the transmission intermediate part, such that a pressure difference between the first and second regions arises. According to the invention, this is advantageously reduced with the aid of the membrane.

An advantage of the present invention is that the compensating membrane reduces pressure differences within the housing. This facilitates the dynamic operation of the actuator. Furthermore, due to the reduction of the pressure difference between the first and second housing regions, the force required for the actuation of the master brake cylinder can also be reduced, which has a positive effect in terms of energy consumption and the dynamic behavior of the actuator. Furthermore, the compensating membrane offers a cost-effective way of closing the housing such that it is liquid-tight while still facilitating pressure equalization between the housing regions.

Advantageous embodiments and developments of the present invention can be found in the disclosure herein.

According to some example embodiments of the present invention, it can be provided that the compensating membrane comprises a flange portion which abuts against the housing in the region of the second opening, and a curved portion which projects from the housing. The flange portion can, for example, abut at least partially against an inner circumferential surface of the second opening. The second opening can generally be designed in particular to be circular in shape. The curved portion can be designed to be conical or frustoconical in particular, but is not limited to this. For example, a spherical curvature or the like can also be provided. Since the curved portion protrudes from an outer surface of the housing, a conflict of installation space with components located in the interior space of the housing is advantageously avoided. In this way, the possible change in volume of the second housing region is also increased.

According to some example embodiments of the present invention, it can be provided that the compensating membrane is formed from a plastics material, in particular a rubber material, such as, ethylene propylene diene monomer, or EPDM for short.

According to some example embodiments of the present invention, it can be provided that the compensating membrane is designed as a closed body. Accordingly, the compensating membrane alone or exclusively closes the second opening. In particular, the compensating membrane can be designed without a passage opening connecting the interior space of the housing with the surrounding area. Accordingly, due to its elastic deformation, the compensating membrane has the sole purpose of increasing or decreasing the volume of the second housing region as a result of a change in pressure, in order to reduce the pressure difference between the housing regions.

According to some example embodiments of the present invention, it can be provided that the transmission comprises an actuating part which can be moved along the longitudinal axis and is kinematically coupled to the master brake cylinder, and a guide part which is coupled to the actuating part and is guided along the longitudinal axis, wherein the guide part forms the transmission intermediate part.

According to some example embodiments of the present invention, it can be provided that the actuating part is designed as a threaded spindle, wherein the transmission comprises a spindle nut, which is in engagement with the threaded spindle, and an input shaft, which is drivable by the electric motor and is in engagement with the spindle nut in order to rotate it about the longitudinal axis. In this way, a space-saving structure of the transmission is realized.

According to some example embodiments of the present invention, it can be provided that the guide part is coupled to the threaded spindle in a rotationally fixed manner. Owing to its guidance along the longitudinal axis, the guide part thus prevents the spindle from rotating with the spindle nut.

According to some example embodiments of the present invention, it can be provided that the threaded spindle is movable into at least one axial position, in which it protrudes through the second opening. The first and second openings can be arranged. e.g. coaxially with one another along the longitudinal axis. The threaded spindle is displaceable along the longitudinal axis, e.g. retracted forwards and backwards, in order to move the piston of the master brake cylinder. The spindle can also be moved into positions in which it protrudes through the second opening. In this case, it is particularly advantageous if the compensating membrane, as described above, comprises a flange portion and a curved portion since the spindle can thus project into the space delimited by the curved portion. Thus, the compensating membrane can also help to realize a more compact structuring of the housing in relation to the longitudinal axis.

According to some example embodiments of the present invention, it can be provided that the guide part is designed as a disk, which comprises on its outer circumference at least one first guide element, in particular a projection, which is in engagement with a second guide element, in particular a guide groove of the housing, extending parallel to the longitudinal axis. The second guide element, e.g. in the form of a groove, can be formed in the housing in particular.

According to some example embodiments of the present invention, it can be provided that the actuator comprises an electrical interface in signal connection with the electric motor in order to connect the electric motor to a voltage source and/or in order to receive control signals for operating the electric motor, wherein the actuator can be operated exclusively via signals received at the interface, in particular without a mechanical substitute actuation interface. Thus, the actuator can be designed for exclusive “by wire” actuation.

The present invention is explained below with reference to the figures.

DETAILED DESCRIPTION OF EXAMPLE EMBODIMENTS

In the figures, identical reference signs denote identical or functionally identical components, unless stated otherwise.

Figure 1:
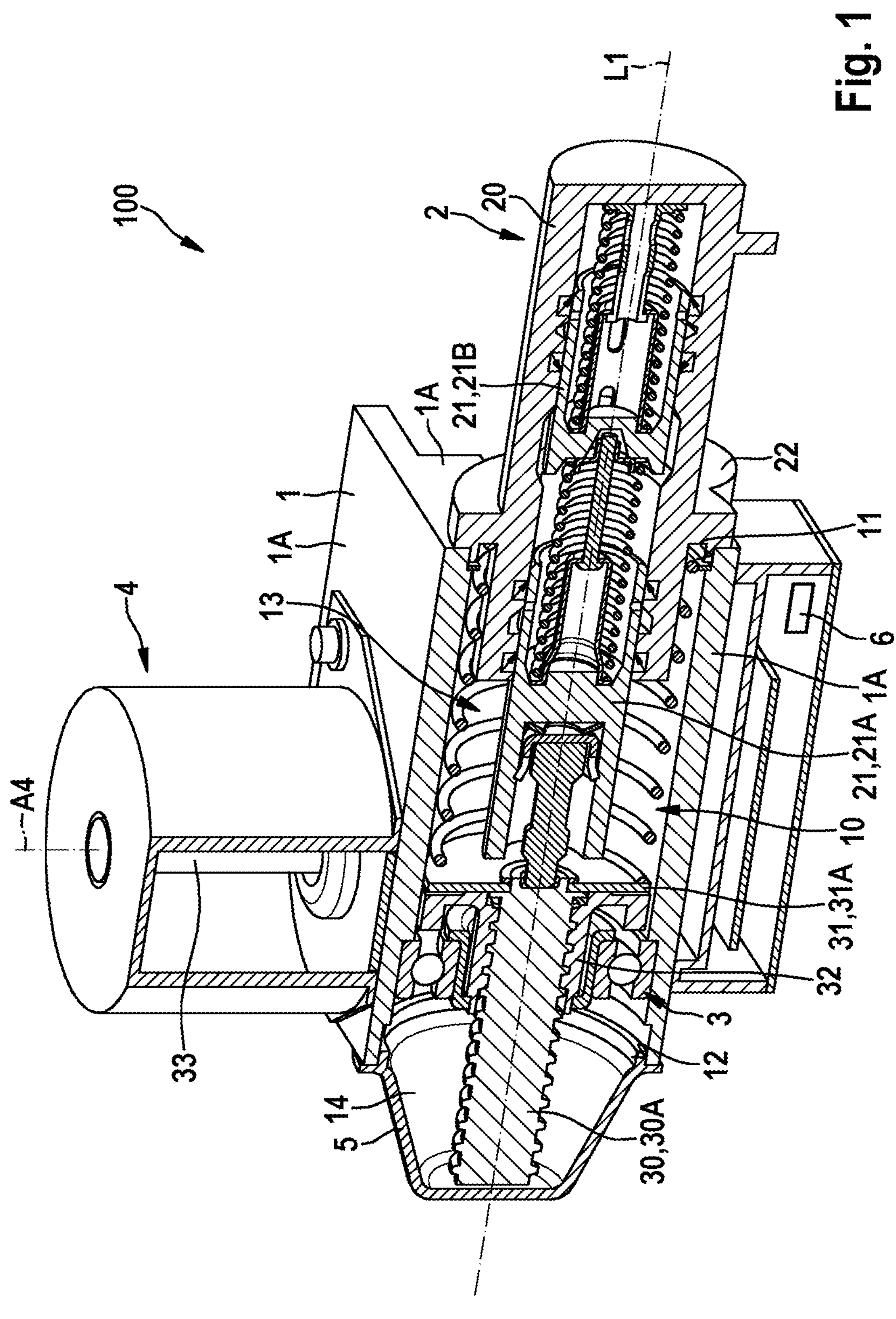
FIG. 1 is a perspective sectional view of an electrohydraulic actuator according to one exemplary embodiment of the present invention.
Figure 2:
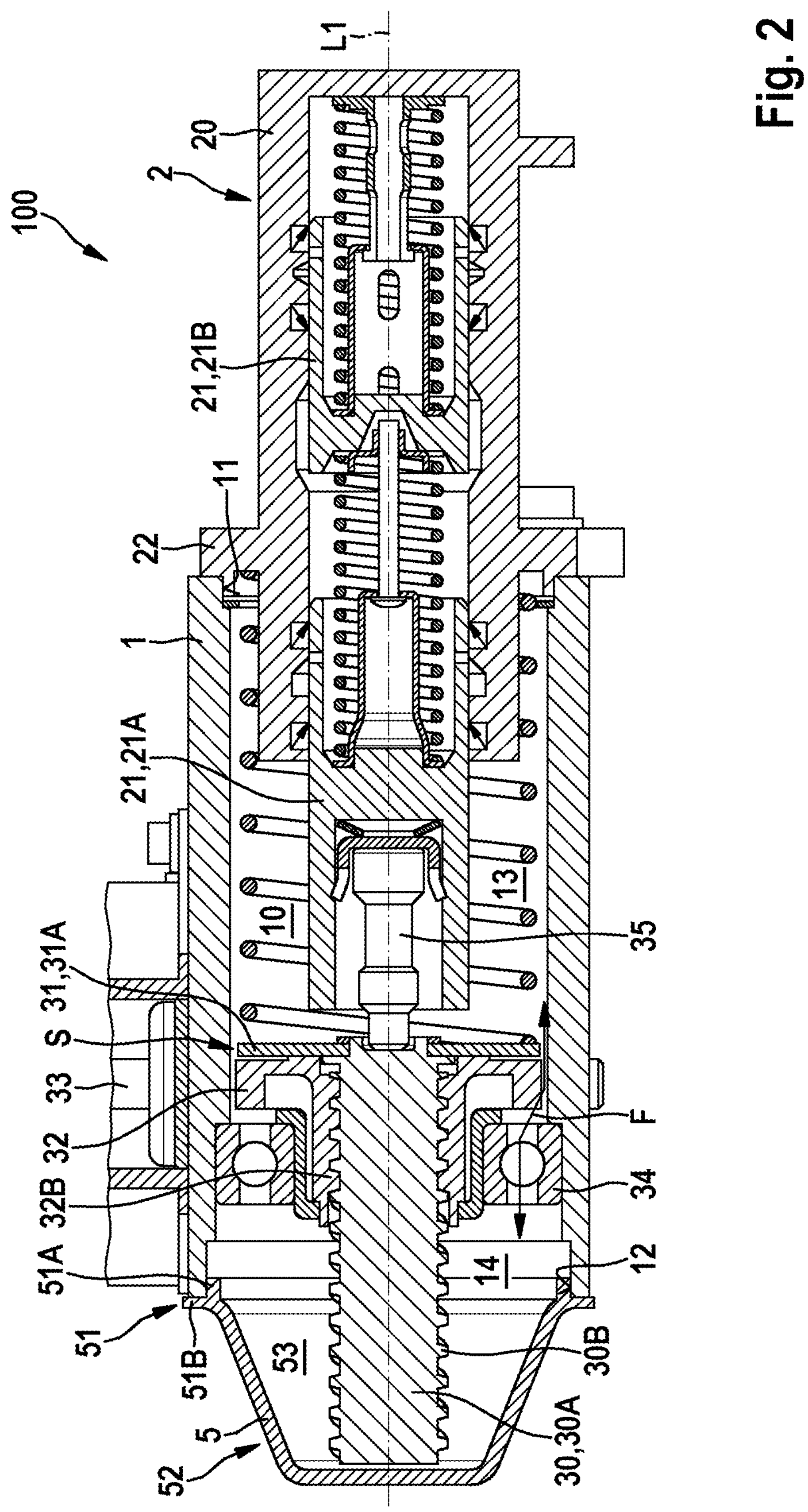
FIG. 2 is a side view of the sectional view of the actuator shown in FIG. 1.

FIG. 1 shows by way of example an electrohydraulic actuator 100 for a brake system, e.g. for a brake system of a motor vehicle. FIG. 2 shows a side view of the actuator from FIG. 1. As shown in FIGS. 1 and 2, the actuator 100 comprises a housing 1, a master brake cylinder 2, a transmission 3, an electric motor 4 and a compensating membrane 5.

Figure 3:
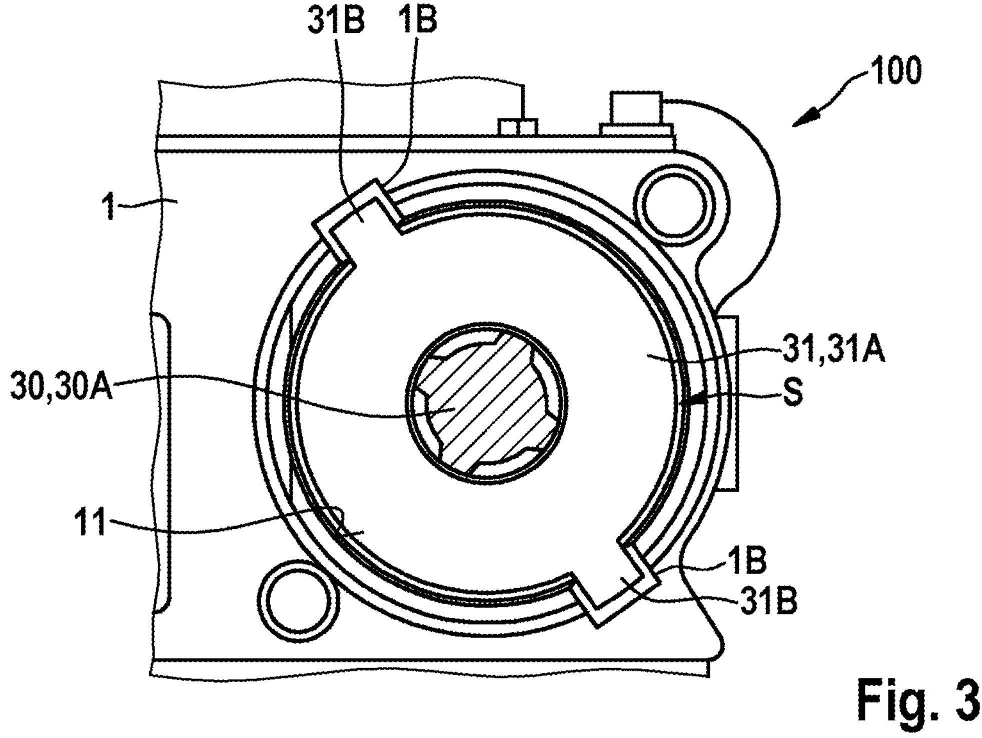
FIG. 3 is a plan view of a first opening of the actuator shown in FIG. 1, wherein a master brake cylinder was omitted.

The housing 1 generally defines an interior space 10. For example, the housing 1 can comprise a plurality of walls 1A, which delimit the interior space 10. The housing 1 comprises in particular a first opening 11 and a second opening 12. The openings 11, 12 form a connection between the interior space 10 and the surrounding area. The openings 11, 12 can, for example, have a circular circumference, as can be seen in FIG. 3, e.g. for the first opening 11. In principle, however, other circumferential shapes of the openings 11, 12 are also possible. As shown by way of example in FIGS. 1 and 2, the first and second openings 11, 12 can be arranged opposite one another. In particular, the first and second openings 11, 12 can be arranged coaxially with one another. For example, the first and second openings 11, 12 can be arranged coaxially with a longitudinal axis L1. In particular, the housing 1 can be a cast housing, e.g. made of a metal material or a plastics material.

The master brake cylinder 2 is designed to convey a hydraulic fluid to and from a hydraulic consumer, e.g. a wheel brake cylinder, in order to build up and reduce hydraulic pressure. For this purpose, the master brake cylinder 2 can in particular comprise a cylinder 20, in which at least one piston 21 is mounted so that it can be displaced axially. In FIGS. 1 and 2, a tandem master brake cylinder 2 with a directly actuatable first piston 21A and a floating piston 21B is shown purely by way of example.

As further shown in FIGS. 1 and 2, the master brake cylinder 2 is positioned in the first opening 11 of the housing 1. In particular, the master brake cylinder 2 protrudes through the first opening 11 into the interior space 10 of the housing 1. The master brake cylinder 2, in particular the piston(s) 21, is/are preferably positioned coaxially with the longitudinal axis L1. The cylinder 20 of the master brake cylinder 2 is arranged in a fixed position on the housing 1, in particular fastened to it, e.g. screwed to it. E.g. a flange 22 can be formed on the cylinder 20, which flange is centered in the first opening 11 and completely covers it, as shown in FIGS. 1 and 2 by way of example. Sealing elements (not shown) can provide an additional seal for the first opening 11. In general, the master brake cylinder 2 is attached to the housing 1 in such a way that it seals the first opening 11 in a fluid-tight manner.

The electric motor 4 is shown merely in simplified form in FIGS. 1 and 2 and can be arranged e.g. on the outer side of the housing 1 and fixed to the housing 1. In particular, the electric motor 4 can be oriented in such a way that an axis of rotation A4, about which a drive shaft of the motor 4 rotates, extends transversely or perpendicularly to the longitudinal axis L1.

The transmission 3 couples the master brake cylinder 2 kinematically to the electric motor 4, in particular in such a way that a rotation of the motor 4 causes a movement of the piston 21 or the pistons 21A, 21B of the master brake cylinder 2 along the longitudinal axis L1. As shown in FIGS. 1 and 2, the transmission 3 is accommodated in the interior space 10 of the housing 1. As shown by way of example in FIGS. 1 and 2, the transmission 3 can comprise an actuating part 30 and a guide part 31. In general, the actuating part 30 is kinematically coupled to the piston 21, in particular the piston 21A of the master brake cylinder 21, e.g. via a connecting rod 35, and is movable along the longitudinal axis L1 by means of the electric motor 4. The guide part 31 is connected or coupled to the actuating part 30 and guided along the longitudinal axis L1, e.g. on the housing 1.

In FIGS. 1 and 2, a transmission 3 is shown purely by way of example, with which the actuating part 30 is designed as a threaded spindle 30A with an external thread 30B and the guide part 31 is designed as a disk 31A guided on the housing 1. Furthermore, the transmission 3 shown by way of example in FIGS. 1 and 2 comprises a spindle nut 32 with an internal thread 32B, which is in engagement with the external thread 30B of the threaded spindle 30A, and an input shaft 33. The spindle nut 32 is rotatably mounted in the housing 1 about the longitudinal axis L1, e.g. by a roller bearing 34, as shown in FIGS. 1 and 2 by way of example. Furthermore, the input shaft 33 can be designed e.g. as a worm shaft, which is in engagement with an external toothing (not shown) of the spindle nut 32. The input shaft 33 can, for example, be connected directly to the drive shaft (not shown) of the electric motor 4.

The guide part 31 or the disk 31A is coupled to the threaded spindle 30A in a rotationally fixed manner and thus forms an anti-rotation lock for the threaded spindle 30A. As shown in FIG. 3 by way of example, the disk 31A can comprise at least one first guide element 31B on its outer circumference, shown in FIG. 3 purely by way of example as a projection, which is in engagement with a second guide element 1B extending parallel to the longitudinal axis L1. FIG. 3 shows purely by way of example that the second guide element 1B can be designed as a guide groove of the housing 1 running parallel to the longitudinal axis L1.

By rotating the spindle nut 32 by means of the input shaft 33 driven by the electric motor 4, the threaded spindle 30A, along with the disk 31A, is displaced along the longitudinal axis L1, such that the threaded spindle 30A moves the piston 21A, which on its part causes a displacement of the floating piston 21B by displacing hydraulic fluid. FIGS. 1 and 2 show by way of example a position of the threaded spindle 30A, in which it is located in a maximally retracted position. This means that the pistons 21A, 21B of the master brake cylinder 21 are located in an initial position and can be moved along the longitudinal axis L1 to build up pressure. As shown by way of example in FIGS. 1 and 2, the threaded spindle 30A can protrude e.g. through the second opening 12 of the housing 1 in this position. In general, the threaded spindle 30A can be movable into at least one axial position, in which it protrudes through the second opening 12.

In general, the master brake cylinder 2 can be actuated by moving the actuating part 30 along the longitudinal axis L1 by means of the electric motor 4. The guide piece 31 is also moved. In this case, the guide piece 31 forms a transmission intermediate part, which subdivides the housing 1 in relation to the longitudinal axis L1 into a first housing region 13, in which the master brake cylinder 2 is arranged, and a second housing region 14, which faces the second opening 12. With the actuator 100 shown in FIGS. 1 and 2 by way of example, the spindle nut 32 and the bearing 34, along with the spindle 30A, are located in the second housing region 14.

As symbolically indicated by a rectangle in FIG. 1, the actuator 100 can comprise an electrical interface 6 in signal connection with the electric motor 4. This interface 6 can be designed for the electrical connection of the electric motor 4 to a voltage source and/or for receiving control signals for operating the electric motor 4. For example, the interface 6 can be designed as a plug socket with connection contacts. Optionally, it can be provided that the electric motor 4 and thus the actuator 100 can be operated exclusively via signals received at the interface 6. As shown in FIGS. 1 and 2, a mechanical coupling between the transmission 3 and a pedal or the like can be dispensed with.

The actuator 100 can thus generally be designed for exclusive "by-wire" actuation.

Figure 4:
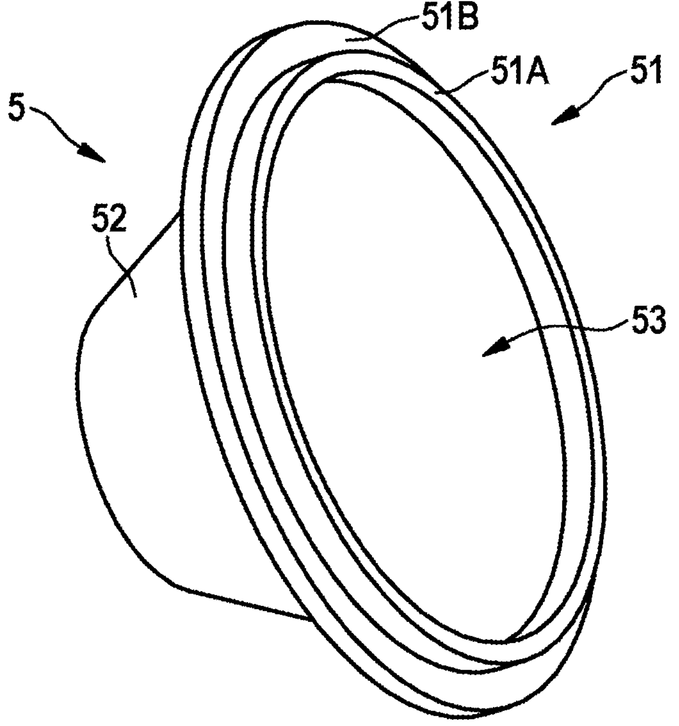
FIG. 4 is a perspective view of a compensating membrane of the actuator shown in FIG. 1.

FIG. 4 shows a perspective view of the compensating membrane 5 by way of example. In general, the compensating membrane 5 is formed from an elastically deformable but gas-impermeable material, in particular a plastics material. For example, the compensating membrane 5 can be formed from a plastics material, in particular a rubber material, such as ethylene propylene diene monomer, or EPDM for short. In general, the compensating membrane 5 is designed as a flat body. As shown in FIG. 4 purely by way of example, the compensating membrane 5 can comprise e.g. a flange portion 51 and a curved portion 52. The flange portion 51 is designed for attachment in and/or on the second opening 12 of the housing 1.

As shown in FIG. 4 by way of example, the flange portion 51 can have e.g. a base or frame portion 51A adapted to the inner circumference of the second opening 12, which in FIG. 4 is formed in an annular shape corresponding to the circular implementation of the second opening 12. Alternatively or additionally, the flange portion 51 can comprise a collar 51B, which is designed to abut against a region of the housing 1 surrounding the second opening 12. For example, the collar 51B can project radially from the base portion 51A, as shown in FIG. 4 by way of example.

The curved portion 52 extends from the flange portion 51 and defines an open interior receiving space 53. As shown in FIG. 4 by way of example, the curved portion 52 can have e.g. the shape of a truncated cone. However, the invention is not limited to this; rather, other curved shapes, e.g. spherical shapes or the like, are also possible.

As shown in FIGS. 1 and 2, the compensating membrane 5 closes the second opening 12 of the housing 1 in a fluid-tight manner. As shown in particular in FIG. 2, the compensating membrane 5 can be partially inserted into the second opening 12. In particular, the base portion 51A can abut against the inner circumferential surface 12 of the second opening 12, while the collar 51B abuts against the region of the housing 1 surrounding the second opening 12. The flange portion 51 thus abuts against the housing 1 in the region of the second opening 12, and the curved portion 52 projects from the housing 1. As shown in FIGS. 1 and 2 by way of example, the actuating part 30, here the threaded spindle 30A can project e.g. into the receiving space 53 defined by the curved portion 52 of the membrane 5. The compensating membrane 5 can, for example, be connected to the housing 1 with a material bond, e.g. glued to it. Alternatively, a mechanical fixation of the compensating membrane 5 to the housing 1 can also be provided, e.g. via a clamping ring (not shown), which clamps the collar 51B of the flange portion 51 between itself and the housing 1.

As shown in FIGS. 1, 3 and 4, the compensating membrane 5 can be designed as a closed body, in particular without a passage opening, e.g. in the curved portion 52. The compensating membrane 5 is thus preferably not intended to have components passed through it and to act as a kind of sleeve, but instead serves to vary an effective internal volume of the housing 10, as will be explained in detail below.

The compensating membrane 5 closes the second opening 12 of the housing 1 in a fluid-tight manner. In the same way, the first opening 11 of the housing 1 is closed in a fluid-tight manner by the master brake cylinder 2. Thus, the interior space 10 of the housing 1 is closed in a substantially fluid-tight manner and the actuator 100, in particular its housing 1, can therefore be considered to be immersion-proof. The transmission intermediate part, in the example of FIGS. 1 and 2, i.e. the guide part 31 or the disk 31A, subdivides the interior space 10 of the housing 10 into the first and second housing regions 13, 14, as explained above. If the actuating part 30 or the spindle 30A is moved rapidly along the longitudinal axis L1, e.g. to achieve a dynamic pressure build-up or pressure reduction by means of the master brake cylinder 2, the transmission intermediate part displaces the air in front of it in the interior space 10 of the housing 1 in relation to the direction of movement. There is only a narrow gap S between the transmission intermediate part and the inner surface of the housing 1, through which air can be exchanged between the first and second housing regions 13, 14. In the example of FIGS. 1 and 2, the bearing 34 and the spindle nut 32 additionally inhibit gas exchange. A possible flow path F between the first and second housing regions 13, 14 is shown symbolically in FIG. 2.

Therefore, a rapid displacement of the transmission intermediate part along the longitudinal axis L1 leads to a transient pressure build-up in one of the housing regions 13, 14 and to a transient pressure reduction in the other of the housing regions 13, 14. This results in a pressure difference between the housing regions 13, 14, which is only slowly reduced, e.g. via the flow path F. The elastic deformability of the compensating membrane 5 advantageously reduces the pressure difference that builds up. If the transmission intermediate part, in this case the disk 31A, is moved together with the spindle 30A, e.g. in the direction of the second opening 12, this leads to a pressure build-up in the first housing region 13 and a pressure reduction in the second housing region 14. The reduced pressure in the second housing region 14 causes a deformation of the compensating membrane 5 in such a way that it reduces the effective volume of the interior space 10 or in such a way that the effective volume of the second housing region 14 remains substantially constant. Figuratively speaking, the deformation of the membrane 5 follows the movement of the transmission intermediate part. In this way, a pressure difference between the first and second housing regions 13, 14 is reduced in the event of an axial displacement of the transmission intermediate part.

Although the present invention has been explained above by way of example with reference to exemplary embodiments, it is not limited thereto, but can be modified in many ways. In particular, combinations of the above exemplary embodiments are also possible.

The invention claimed is:

1. An electrohydraulic actuator for a brake system, comprising:

a housing which defines an interior space and has a first opening and a second opening;

a master brake cylinder which is positioned in the first opening and is attached to the housing in such a way that the first opening is sealed in a fluid-tight manner;

an electric motor arranged on the housing;

a transmission which is accommodated in the interior space of the housing and is kinematically coupled to the master brake cylinder, wherein the transmission includes a transmission intermediate part which can be moved along a longitudinal axis and subdivides the housing, in relation to the longitudinal axis, into a first housing region, in which the master brake cylinder is arranged, and a second housing region, which faces the second opening; and a compensating membrane which closes the second opening in a fluid-tight manner and is elastically deformable in order to reduce a pressure difference between the first housing region and the second housing region in the event of an axial displacement of the transmission intermediate part, wherein the compensating membrane is a closed body, without a passage opening connecting the interior space of the housing with a surrounding area.

2. The actuator according to claim 1, wherein the compensating membrane includes a flange portion which abuts against the housing in a region of the second opening, and a curved portion which projects from the housing.

3. The actuator according to claim 1, wherein the compensating membrane is made of a plastics material.

4. The actuator according to claim 3, wherein the plastics material is ethylene propylene diene monomer.

5. The actuator according to claim 1, wherein the transmission includes an actuating part which can be moved along the longitudinal axis and is kinematically coupled to the master brake cylinder, and a guide part which is coupled to the actuating part and is guided along the longitudinal axis, wherein the guide part forms the transmission intermediate part.

6. The actuator according to claim 1, further comprising:

an electrical interface in signal connection with the electric motor to connect the electric motor to a voltage source and/or to receive control signals for operating the electric motor, wherein the actuator can be operated exclusively via signals received at the interface without a mechanical substitute actuating interface.

7. An electrohydraulic actuator for a brake system, comprising:

a housing which defines an interior space and has a first opening and a second opening;

a master brake cylinder which is positioned in the first opening and is attached to the housing in such a way that the first opening is sealed in a fluid-tight manner;

an electric motor arranged on the housing;

a transmission which is accommodated in the interior space of the housing and is kinematically coupled to the master brake cylinder, wherein the transmission includes a transmission intermediate part which can be moved along a longitudinal axis and subdivides the housing, in relation to the longitudinal axis, into a first housing region, in which the master brake cylinder is arranged, and a second housing region, which faces the second opening; and a compensating membrane which closes the second opening in a fluid-tight manner and is elastically deformable in order to reduce a pressure difference between the first housing region and the second housing region in the event of an axial displacement of the transmission intermediate part, wherein the transmission includes an actuating part which can be moved along the longitudinal axis and is kinematically coupled to the master brake cylinder, and a guide part which is coupled to the actuating part and is guided along the longitudinal axis, wherein the guide part forms the transmission intermediate part, wherein the actuating part is a threaded spindle, wherein the transmission includes a spindle nut which is in engagement with the threaded spindle, and an input shaft, which is drivable by the electric motor and is in engagement with the spindle nut in order to rotate it about the longitudinal axis.

8. The actuator according to claim 7, wherein the guide part is coupled to the threaded spindle in a rotationally fixed manner.

9. The actuator according to claim 7, wherein the threaded spindle is movable into at least one axial position, in which the threaded spindle protrudes through the second opening.

10. An electrohydraulic actuator for a brake system, comprising:

a housing which defines an interior space and has a first opening and a second opening;

a master brake cylinder which is positioned in the first opening and is attached to the housing in such a way that the first opening is sealed in a fluid-tight manner;

an electric motor arranged on the housing;

a transmission which is accommodated in the interior space of the housing and is kinematically coupled to the master brake cylinder, wherein the transmission includes a transmission intermediate part which can be moved along a longitudinal axis and subdivides the housing, in relation to the longitudinal axis, into a first housing region, in which the master brake cylinder is arranged, and a second housing region, which faces the second opening; and a compensating membrane which closes the second opening in a fluid-tight manner and is elastically deformable in order to reduce a pressure difference between the first housing region and the second housing region in the event of an axial displacement of the transmission intermediate part, wherein the transmission includes an actuating part which can be moved along the longitudinal axis and is kinematically coupled to the master brake cylinder, and a guide part which is coupled to the actuating part and is guided along the longitudinal axis, wherein the guide part forms the transmission intermediate part, wherein the guide part is a disk, which includes on its outer circumference at least one first guide element including a projection, which is in engagement with a second guide element which includes a guide groove of the housing extending in parallel with the longitudinal axis.

* * * * *